Patented Mar. 17, 1942

2,276,598

UNITED STATES PATENT OFFICE 2,276,598

PROCESS FOR THE MANUFACTURE OF HEAVY METAL COMPOUNDS OF PHTHALOCYANINES

Robert Stocker and Armin Bucher, Basel, Switzerland, assignors to the firm of Society of Chemical Industry in Basle, Basel, Switzerland No Drawing. Application March 1, 1940, Serial No. 321,804. In Switzerland March 13, 1939

5 Claims. (Cl. 260—314)

It is known that dyestuffs of the phthalocyanine series can be made by heating a cyclic ortho-dinitrile with a metal salt in the presence of a solvent. The solvents used for this purpose consist of tertiary bases such as pyridine or quinoline; owing to their high cost these solvents do not come into question for a commercial process. It has therefore been proposed to use instead of these solvents other cheaper indifferent organic diluents, such as hydrocarbons and their derivatives, for example naphthalene, aromatic nitro-compounds and the like. These indifferent organic diluents, however, frequently result in insufficient yields of the dyestuffs so that a method of working which would be based on the use of the indifferent organic solvents without further additions, is not suitable for use on a commercial scale.

It has also been proposed to overcome this difficulty by combining the two processes, there being used a large proportion of the cheap indifferent organic diluent and a small proportion of a tertiary base, especially with the formation of soluble complex compounds from metal salts and tertiary bases. This process again depends in part on the use of uneconomical materials.

This invention is based on the observation that the reaction of cyclic ortho-dinitriles, or of compounds which yield these, with agents yielding heavy metal in the presence of an indifferent organic diluent can be promoted and good yields of the dyestuffs can be obtained by adding to the reaction mixture a small proportion of a compound of alkaline action free from nitrogen of an alkali or alkaline earth metal.

As examples of cyclic ortho-dinitriles or compounds which yield these there may be named phthalonitrile, ortho-cyanobenzamide and its derivatives, ortho-dinitriles of poly-nuclear hydrocarbons and their derivatives such as those of naphthalene, anthraquinone, pyridine, quinoline or the like.

Suitable indifferent organic diluents are quite generally the compounds known in the literature as indifferent solvents, for example nitrobenzene, ortho-nitrotoluene, α-chloronaphthalene and other derivatives of benzene and naphthalene. However, there can be used not only aromatic compounds, but also products such as paraffin. When using volatile diluents it is advisable to operate in a closed apparatus under increased pressure.

Examples of compounds of alkaline action free from nitrogen of alkali or alkaline earth metals suitable for use in the invention are their oxides, hydroxides, carbonates, phosphates, tetraborates, silicates, their salts with organic acids, such as formates, acetates and the like.

The manufacture in accordance with the invention may be conducted by stirring together and heating a cyclic ortho-dinitrile and an agent yielding heavy metal, for example a halogen compound of copper, nickel or the like, in one of the above described indifferent diluents. A small proportion of one of the aforesaid compounds promoting the reaction may then be added, whereupon formation of the dyestuff commences after further heating for a short time and is finished after some time. The aforesaid compounds promoting the reaction may in some cases be added before the heating.

With the use of simple and cheap reagents the invention results in a substantial acceleration of the reaction and in good yields as is evident from the following comparative examples illustrating the invention and hitherto known processes. In the examples the parts are by weight.

Example 1

13 parts of pure phthalonitrile and 72 parts of freshly distilled nitrobenzene are heated together in an oil bath to 160° C. whilst stirring and 2.8 parts of cuprous chloride are then added. The whole is then heated to 185° C. and 0.1 part of powdered sodium hydroxide is added. The whole is then heated to boiling. After a short time an abundant precipitation of the dyestuff can be observed. After heating for 4 hours the reaction mixture is cooled somewhat, the dyestuff is freed from the diluent, for example by distillation with steam, extracted with boiling dilute hydrochloric acid, filtered and dried. 13.5 parts of copper phthalocyanine are obtained, corresponding with a yield of 92.5 per cent.

If the reaction mixture is heated for 13 hours longer there are obtained 14.54 parts of the dyestuff, corresponding with a yield of 99.4 per cent.

Example 2

If in Example 1, 1.5 parts of finely powdered calcium oxide are added instead of 0.1 part of sodium hydroxide there are obtained after 17 hours boiling in a reflux apparatus 13.95 parts of copper phthalocyanine, corresponding with a yield of 95.6 per cent.

Example 3

When substituting 1.53 parts of sodium silicate dehydrated at 220° C. for the 0.1 part of sodium hydroxide of Example 1, there are obtained 14.0 parts of copper phthalocyanine after boiling in a reflux apparatus for 17 hours, corresponding with a yield of 95.9 per cent.

Example 4

When substituting 1.0 part of dehydrated, finely powdered sodium acetate for the 0.1 part of sodium hydroxide of Example 1, there are obtained 13.65 parts of copper phthalocyanine after boiling in a reflux apparatus for 17 hours, corresponding with a yield of 93.5 per cent.

The success is similar when substituting in this example 0.9 part of sodium formate for the sodium acetate.

Example 5

This example shows the results obtainable without the addition of the alkaline substance for promoting the reaction. 13 parts of pure phthalonitrile and 2.8 parts of cuprous chloride are stirred together in 72 parts of freshly distilled nitrobenzene and the whole is heated to boiling in an oil bath for 4 hours. The reaction mixture is then worked up in the manner described in Example 1 whereby there are obtained 2.9 parts of copper phthalocyanine, corresponding with a yield of only 19.82 per cent.

If the reaction mixture is heated for 13 hours longer there are obtained 4 parts of the dyestuff corresponding with a yield of only 27.4 per cent.

Example 6

13 parts of pure phthalonitrile and 72 parts of freshly distilled α-chloronaphthalene are heated in an oil bath to 160° C. whilst stirring. 2.8 parts of cuprous chloride are then added, the whole is heated to 185° C. and 0.1 part of powdered sodium hydroxide is added. The whole is heated for 4 hours at 220° C. and then cooled and diluted with alcohol. The whole is filtered and the filter cake is heated with mineral acid to boiling, again filtered, washed with water and dried. 13.7 parts of copper phthalocyanine are obtained, corresponding with a yield of 95.9 per cent.

If in this example 1.5 parts of dehydrated sodium carbonate are added instead of 0.1 part of sodium hydroxide, 12.94 parts of the dyestuff are obtained corresponding with a yield of 88.5 per cent.

The α-chloronaphthalene may be replaced by other diluents. When substituting for example 100 parts of paraffin for the 72 parts of α-chloronaphthalene of the first paragraph of this example, the copper phthalocyanine is obtained also in good yield.

Example 7

13 parts of pure phthalonitrile and 2.8 parts of cuprous chloride are stirred together in 72 parts of freshly distilled α-chloronaphthalene and the whole is heated in an oil bath for 4 hours at 220° C. By working up the reaction mixture in the manner indicated in Example 6, 6.7 parts of copper phthalocyanine, that is a yield of only 45.8 per cent, are obtained.

Example 8

If in Example 1 instead of 72 parts of nitrobenzene there is used an equal quantity of orthonitrotoluene there are obtained after 17 hours heating at 220° C. 12.9 parts of copper phthalocyanine, that is to say a yield of about 88.3 per cent.

What we claim is:

1. Process for the manufacture of heavy metal compounds of phthalocyanines by heating cyclic ortho-dinitriles with compounds yielding heavy metal in the presence of indifferent liquid organic diluents, comprising adding to the mixture small proportions of compounds selected from the group consisting of sodium hydroxide, calcium oxide and sodium carbonate as promoters of the reaction.

2. Process for the manufacture of copper compounds of phthalocyanines by heating cyclic ortho-dinitriles with copper compounds in the presence of indifferent liquid organic diluents, comprising adding to the mixture small proportions of compounds selected from the group consisting of sodium hydroxide, calcium oxide and sodium carbonate as promoters of the reaction.

3. Process for the manufacture of heavy metal compounds of phthalocyanines by heating phthalonitriles with compounds yielding heavy metal in the presence of indifferent liquid organic diluents, comprising adding to the mixture small proportions of compounds selected from the group consisting of sodium hydroxide, calcium oxide and sodium carbonate as promoters of the reaction.

4. Process for the manufacture of copper compounds of phthalocyanines by heating phthalonitriles with copper compounds in the presence of indifferent liquid organic diluents, comprising adding to the mixture small proportions of compounds selected from the group consisting of sodium hydroxide, calcium oxide and sodium carbonate as promoters of the reaction.

5. Process for the manufacture of copper phthalocyanine by heating phthalonitrile with copper compounds in the presence of indifferent liquid organic diluents, comprising adding to the mixture small proportions of compounds selected from the group consisting of sodium hydroxide, calcium oxide and sodium carbonate as promoters of the reaction.

ROBERT STOCKER.
ARMIN BUCHER.